March 26, 1935. M. J. DONNELLY 1,995,969
NONGLARE AND SUNSHADE
Filed March 15, 1934
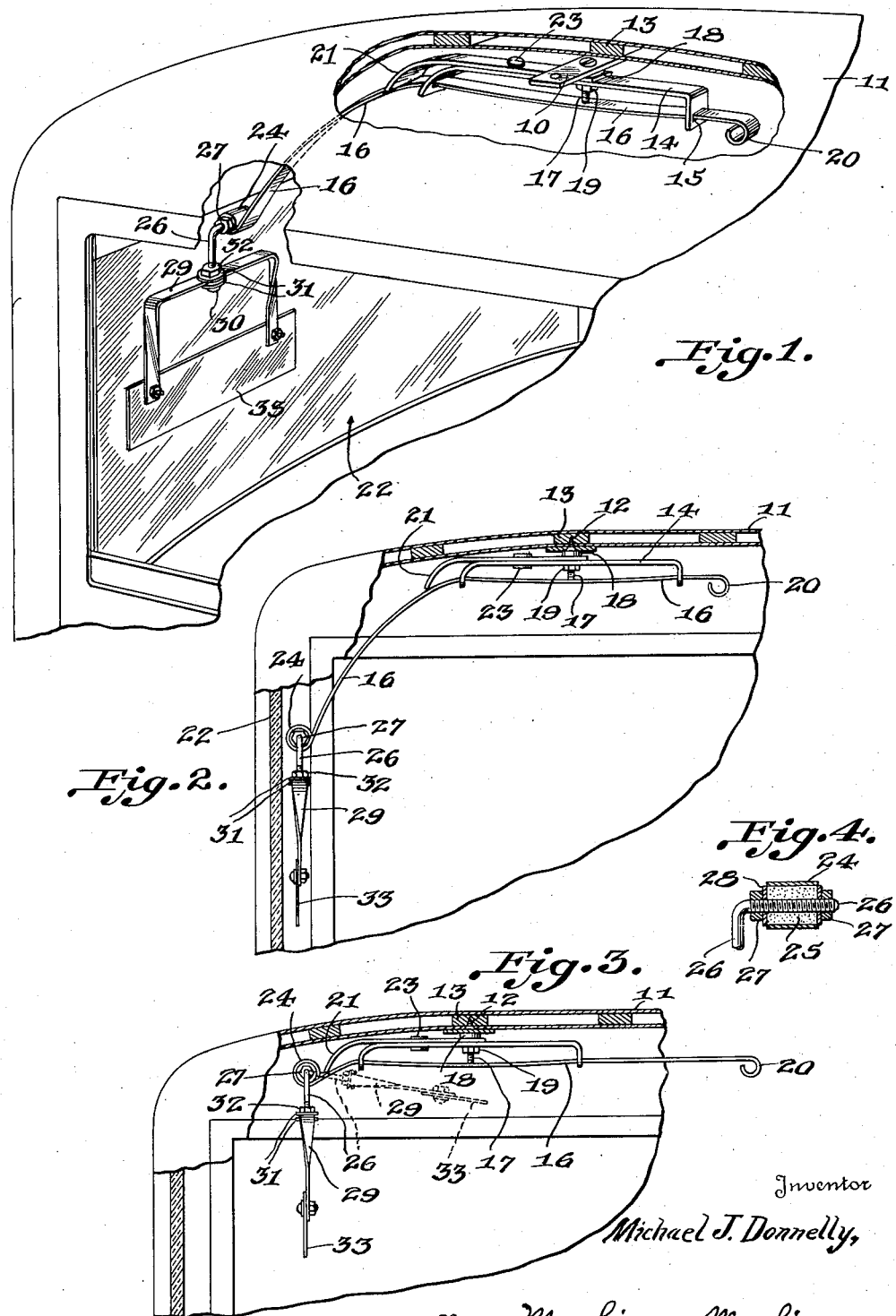
Inventor
Michael J. Donnelly,
By Mawhinney & Mawhinney,
Attorneys Patented Mar. 26, 1935

1,995,969

UNITED STATES PATENT OFFICE 1,995,969

NONGLARE AND SUNSHADE

Michael J. Donnelly, Whiting, Ind.

Application March 15, 1934, Serial No. 715,711

6 Claims. (Cl. 296—97)

The present invention relates to a shield for protecting the eyes of the driver of an automobile or the like against the glare of sunlight and headlights or the like normally projected in the face of the driver and which lead to confusion and hinder the proper vision of the roadway ahead.

An object of the present invention is to provide a shield of this character which will lie relatively flat against the top and windshield of the vehicle, which may be quickly and easily adjusted without the use of fastening devices or the like, and which is capable of vertical, lateral and pivotal adjustments at such points as are highly desirable and effective for the support of the visor where desired.

Another object of the present invention is to provide an improved spring bracket and arm with the visor adjustably mounted on the outer end of the arm and the arm being frictionally held for longitudinal sliding movement in the bracket, and wherein the bracket may be pivotally supported against the roof of the vehicle so that the bracket may be swung into various positions about its pivot to dispose the visor at the side or in front of the operator.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a perspective view of the non-glare and sunshade of this invention as applied to the driving compartment of a motor vehicle, the latter being shown fragmentarily and partly in section.

Figure 2 is a side elevation of the same, the body of the vehicle being shown in section.

Figure 3 is a similar view but with the shade or shield raised and folded up out of the way, and Figure 4 is a detail enlarged sectional view taken through the friction eye at the end of the resilient arm for adjustably holding the visor on its horizontal pivot.

Referring now to the drawing, 10 designates an attaching plate or strip of suitable width and length and which is adapted to be secured against the under side of a vehicle roof 11 by means of screws 12 or the like which may be engaged in one of the cross ribs 13 of the roof 11. The plate 10 pivotally carries a bracket 14. The bracket 14 is in the form of a resilient strap having its opposite ends turned downwardly and provided with slots 15 which slidably and frictionally receive therethrough the intermediate portion of a resilient arm 16. The rear end of the bracket 14 has its extremity turned downwardly at preferably a right angle while the forward end of the bracket 14 is curved downwardly on a suitable radius to impart a tension upon the arm 16 when in the bracket.

The bracket 14 is pivotally mounted upon the plate 10 intermediate the ends of the bracket 14 by means of a threaded pin 17 which may have a kerfed head at its upper end countersunk in the upper surface of the plate 10, and which has a shank projecting downwardly through a friction washer 18 of rubber or other suitable material adapted to be compressed between the plate 10 and the bracket 14 by means of a nut 19 threaded on the lower end of the pin 17. The nut 19 is adapted to be turned up against the under side of the bracket 14 to tension the bracket against the rubber washer 18 so as to yieldingly hold the bracket in adjusted position axially about the pivot pin 17. The resilient arm 16 is rolled over at its rear end to provide a handle 20 although any other suitable configuration may be given to the arm 16 to accomplish the purpose. The forward end of the arm 16 passes beyond the bracket 14 and beneath a deflecting finger 21 which is relatively stiff and curved forwardly and downwardly from the bracket 14 to engage and hold the intermediate portion of the arm 16 below the plane of the adjacent slot 15 so that the arm 16 is curved downwardly and directed toward the intermediate portion of the windshield 22 of the vehicle. The arm 21 is secured along the upper face of the bracket 14 by a rivet 23, and the rear end of the finger 21 is apertured for receiving the pin 17 therethrough so as to hold the finger from turning on the bracket.

The forward lower end of the arm 16 is rolled over to provide an eye 24 which extends transversely of the arm and forms a housing for a friction block 25 of rubber or the like which is compressed within the housing and about a stem 26. Clamping nuts 27 are threaded on the opposite ends of the stem 26 and engage plates 28 or washers which bear against the opposite ends of the block 25 for compressing the latter, and the nuts 27 may be adjusted for tensioning the turning of the stem 26 in the eye 24. The stem 26 is turned downwardly at one end and pivotally engages through a yoke or frame 29 for the visor. The stem is provided with a head 30 on its lower end beneath the frame 29 and also has a pair of washers 31 arranged at opposite sides of the frame 29 and a clamping nut 32 threaded on the stem for binding engagement against the adjacent washer 31 to exert the desired tension upon the yoke or frame 29 to hold it in axially adjusted position relative to the stem. The lower ends of the frame or yoke 29 are secured to a visor 33 which may be in the form of a sheet of suitably colored celluloid or the like and the sheet 33 may be relatively small as the bracket or holder is capable of various adjustments so as to impair vision through the windshield as little as possible.

In use, after the device is secured against the under side of the roof 11 of the vehicle, the operator may grasp the handle 20 and push the same forwardly to slide the resilient arm 16 through the slots 15 of the bracket 14 so as to force the arm forwardly beneath the deflecting finger 21 and thus move the visor 33 down to the desired height in the line of vision of the operator.

The arm 16 is tensioned not only by the deflecting finger 21 but also by the lower end of the pivot pin 17 which frictionally engages the intermediate portion of the arm 16 between the slotted ends 15 of the bracket. This tension on the arm 16 is sufficient to hold the latter in any adjusted position. Of course the yoke or frame 29 may be swung about the stem 26 to the desired angle so as to accommodate the shield to the front or side of the vehicle. The bracket 14 itself may be readily swung about the pivot 17 by pressing laterally on the handle 20 so as to swing the visor into the desired angle in front of the operator.

The transverse eye 24 pivotally supports the stem 26 of the visor so that the visor may be swung back and forth on the horizontal pivot into various desired positions in front of the operator, and also into a raised position out of the way, as shown in dotted lines in Figure 3. When the device is not in use the handle 20 may be drawn back to the desired extent for raising the eye 24 into a position close to the roof of the vehicle so that the entire visor and its support are disposed relatively flat against the roof and out of the way. It will be noted that both the raising and lowering and the laterally swinging adjustments of the arm 16 may be accomplished by grasping the handle 20, whereas the visor 33 or its frame 29 may be grasped to swing the visor on its horizontal and on its vertical pivots.

It is obvious that various changes and modifications may be made in the details of construction and design of the above specifically described embodiment of this invention without departing from the spirit thereof, such changes and modifications being restricted only by the scope of the following claims.

What is claimed is:—

1. A non-glare and sunshade comprising a visor, a bracket, means for mounting the bracket in the top of a motor vehicle or the like, a resilient arm frictionally slidable in the bracket and connected to the visor, said arm adapted to be slid through the bracket to adjust said visor, and means carried by the bracket and engaging said arm forwardly of the bracket for directing said arm downwardly.

2. A non-glare shield comprising a bracket, means for mounting the bracket in the top of a motor vehicle or the like, a resilient arm frictionally slidable in the bracket and adapted to be forced lengthwise in the bracket for extending and retracting the arm and said bracket adapted to be turned on its pivot for adjusting said arm laterally, a visor mounted on the outer end of said arm, and a deflecting finger mounted on the forward end of the bracket for directing the arm downwardly.

3. A non-glare shield comprising a bracket, a resilient arm slidably mounted in the bracket, a deflecting finger mounted on the forward end of the bracket and engaging said arm for directing the same downwardly from the bracket, a visor mounted on the forward end of said arm, and means for pivotally supporting the bracket in the top of a motor vehicle.

4. A non-glare shield comprising a bracket, means for pivotally supporting the bracket at the under side of a vehicle top, a resilient arm mounted lengthwise in the bracket, a deflecting finger carried by the bracket and engaging the outer portion of the arm to deflect the latter downwardly from the roof of the vehicle, a stem pivotally mounted transversely in the outer end of the arm and having a downwardly extending portion, and a visor mounted on the down-turned end of the stem for pivotal movement at right angles to the connection of the stem with the arm.

5. A non-glare shield comprising a resilient bracket, a resilient arm slidably mounted in the bracket and frictionally engaged therein for holding the arm in lengthwise adjusted position in the bracket, a deflecting finger mounted on the bracket and engaging the forward portion of the resilient arm for directing the latter downwardly and forwardly from the bracket, means for pivotally mounting the bracket against the under side of the roof of a vehicle, said resilient arm having a handle on its rear end for sliding said arm through the bracket and for swinging the bracket about its pivotal mounting to adjust the arm laterally and downwardly relative to the vehicle top, and a visor adjustably mounted on the forward end of said arm.

6. A non-glare shield comprising a resilient bracket, a pivot device carried by the bracket for mounting on the under side of the roof of a vehicle, a resilient arm fitting under tension through the bracket and adapted for sliding adjustment therethrough to project the arm to the desired distance from the bracket, a deflecting finger carried by the bracket and engaging the forward portion of the arm for directing the arm downwardly from the bracket, said arm having a rolled transverse eye on its forward end, a stem mounted through the eye and having a downwardly extending portion, resilient means mounted in the eye to yieldingly hold the stem in adjusted position in the eye, a yoke frictionally pivoted upon the lower end of said stem for adjustment on an axis at right angles to said eye, and a visor mounted on said yoke and supported thereby for adjustment into the line of vision of a vehicle operator.

MICHAEL J. DONNELLY.